E. W. IVES.
Improvement in Carriage-Axles.

No. 114,147.  Patented April 25, 1871.

Witnesses:
E. D. Ives
F. A. Lehmann

Inventor:
Eldridge W. Ives

United States Patent Office.

ELDRIDGE W. IVES, OF HAMDEN, CONNECTICUT.

Letters Patent No. 114,147, dated April 25, 1871.

IMPROVEMENT IN CARRIAGE-AXLES.

The Schedule referred to in these Letters Patent and making part of the same.

*To all whom it may concern:*

Be it known that I, ELDRIDGE W. IVES, of Hamden, New Haven county, Connecticut, have invented certain new and useful Improvements in Carriage-Axles, of which the following is a specification.

The nature of my invention consists in inserting on the lower and bearing side of the axle a strip of hard rolled brass or other suitable metal, so as to prevent the wearing away of the axle at that point; and in the peculiar shape of the strip of metal which I employ, whereby it is held securely in place, and thus prevented from being withdrawn or lost.

Figure 1:
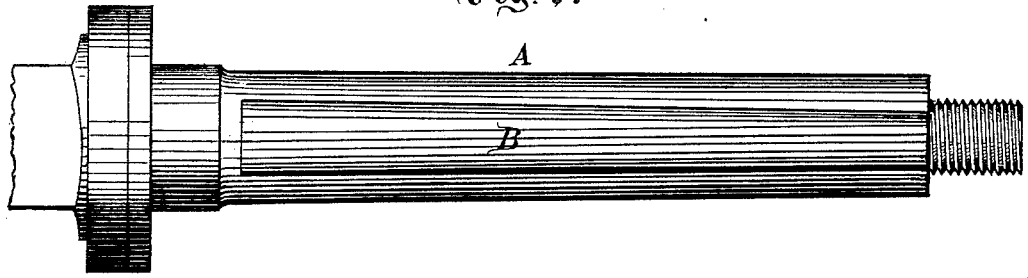
Figure 1 represents a view of the under side of the axle, showing the strip of brass or other metal and its shape.
Figure 2:
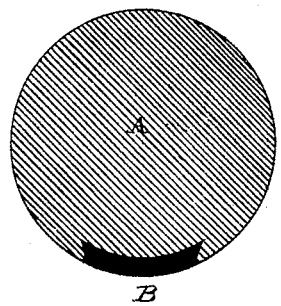
Figure 2 is a transverse sectional view of the axle.

A represents an axle of the ordinary form and construction, on the lower side of which I cut a groove, as shown in fig. 2, dovetailed at each side, so that the groove is wider at its lowest depth than at its surface. This groove may extend the whole or only a part of the length of the axle, and should be about one-sixteenth of an inch in depth, and wider at the end nearest the collar than the outer one.

Into this groove is sprung or neatly fitted a strip of hard rolled brass, B, or other suitable material, corresponding to the shape of the groove.

When the axle is inserted into the box the weight of the carriage rests entirely upon the strip B, and as the strip is composed of metal tougher and better adapted to withstand and wear than iron, the axle will last much longer.

It is well known that the wear upon the axle comes entirely upon its under side, and that, when not kept plentifully oiled, the friction of the box on the axle causes the axle to become heated, and it then expands until it becomes too large for the box, causing a greater exertion of the animals to draw the vehicle, and a greater wear upon both box and axle.

When a strip of brass is inserted in the axle, as shown, the brass, not allowing the axle to rest upon the box, acts as an insulator, and thereby prevents both wearing and heating.

As soon as the strip B becomes worn it can be readily removed and another inserted in its place.

By making the strip larger at its inner than at its outer end it is held securely in place without the aid of screws or bolts.

Having thus described my invention,

What I claim as new, and desire to secure by Letters Patent, is—

1. The strip of hard rolled brass B, or other suitable hard metal, inserted longitudinally into the under side of the axle A, so as to prevent the wearing and heating of the axle, substantially as described.

2. The strip of hard rolled brass B, or other suitable hard metal, wider at its inner than its outer end, and inserted in a groove on the under side of the axle, substantially as shown and described.

ELDRIDGE W. IVES.

Witnesses:
  E. D. IVES,
  F. A. LEHMANN.